UNITED STATES PATENT OFFICE.

LUCAS PETRON KYRIAKIDES AND RICHARD B. EARLE, OF BOSTON, MASSACHUSETTS, ASSIGNORS TO HOOD RUBBER COMPANY, OF BOSTON, MASSACHUSETTS, A CORPORATION OF MASSACHUSETTS.

PROCESS OF PRODUCING ERYTHRENE.

1,033,327.  Specification of Letters Patent.  Patented July 23, 1912.

No Drawing. Application filed November 11, 1911. Serial No. 659,821.

*To all whom it may concern:*

Be it known that we, LUCAS P. KYRIAKIDES and RICHARD B. EARLE, citizens of the United States, residing at Boston, Massachusetts, have invented certain new and useful Improvements in Processes for Producing Erythrene, of which the following is a specification.

Our invention relates to a new and valuable process for producing erythrene (divinyl) which is a valuable hydrocarbon used for the production of rubber-like substances and terpenes.

The new process consists in passing the vapors of normal butyraldehyde of the formula:

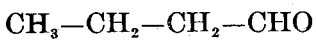

over dehydrating catalytics, such as aluminum silicate at temperatures ranging from 500°-600° C., and pressures less than 60 millimeters of mercury.

The reaction consists of the splitting off of water as:

In order to illustrate the process more fully the following example is given. The butyraldehyde is distilled slowly over aluminum silicate either powdered or in briquet form, the pressure being reduced to one millimeter of mercury by a vacuum pump and the aluminum silicate being kept at a temperature of 550° C. The products of the reaction are condensed in suitable receivers by means of refrigerating agents and purified by distillation. The unchanged butyraldehyde is again passed over the catalytic as before, the total yield of crude erythrene being over 70% of the theory.

We claim:

1. The process for producing erythrene which consists in passing the vapors of normal butyraldehyde

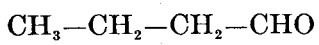

over heated dehydrating catalytics at temperatures ranging from 500°-600° C., *in vacuo*, at pressures less than 60 millimeters of mercury.

2. The process for producing erythrene which consists in passing the vapors of normal butyraldehyde:

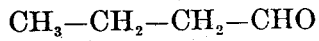

over heated aluminum silicate at temperatures from 500°-600° C., *in vacuo*, at pressures less than 60 millimeters of mercury.

In testimony whereof, we affix our signatures in presence of two witnesses.

LUCAS PETRON KYRIAKIDES.
RICHARD B. EARLE.

Witnesses:
JESSIE R. MOTT,
M. ALICE HAGARTY.